March 2, 1937.  G. R. KREIDER, JR  2,072,678
METHOD AND APPARATUS FOR MAKING BOXES
Original Filed July 29, 1932  5 Sheets-Sheet 1
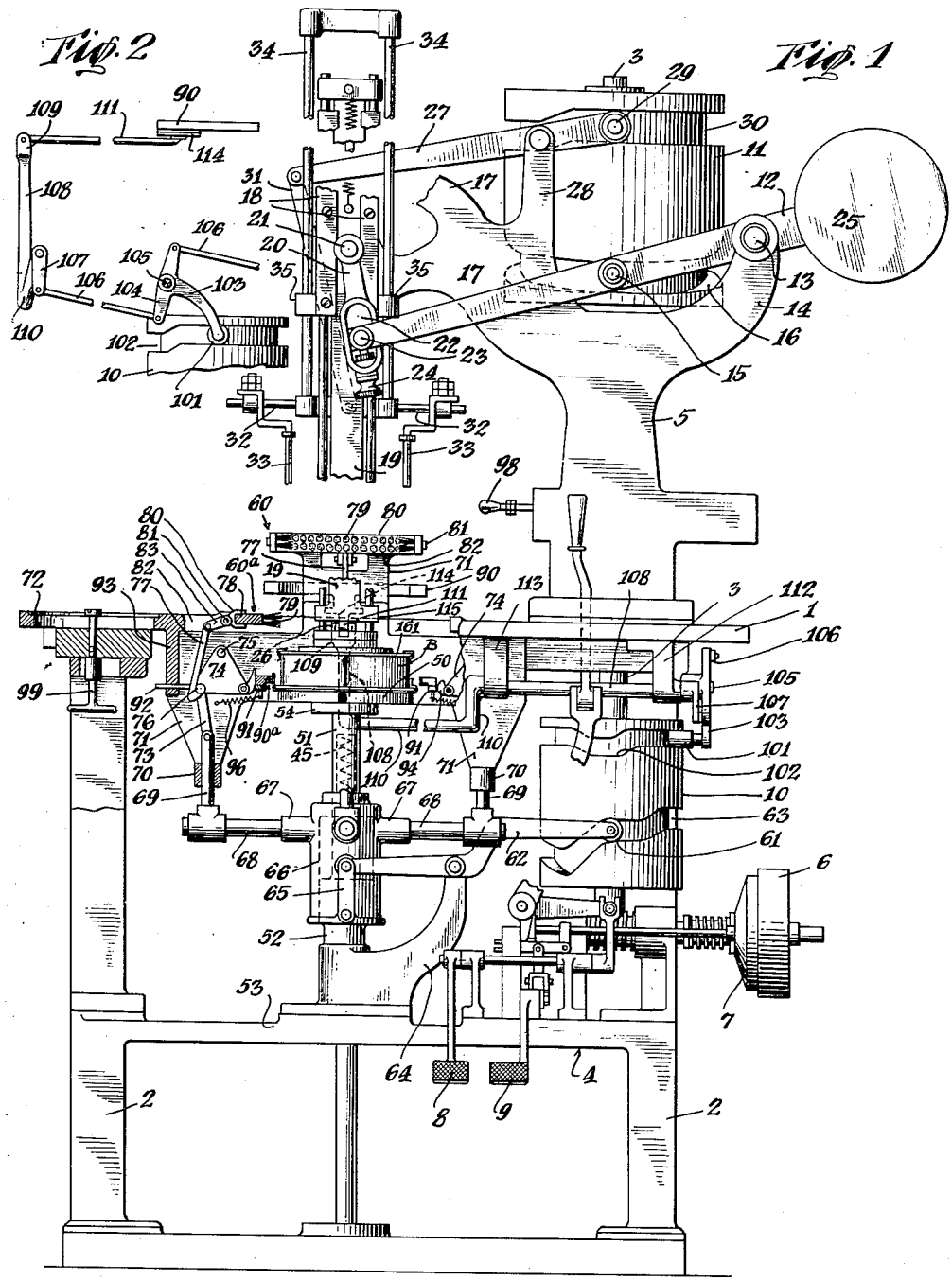
INVENTOR
Gideon R. Kreider, jr.
BY
Austin & Dix
ATTORNEYS

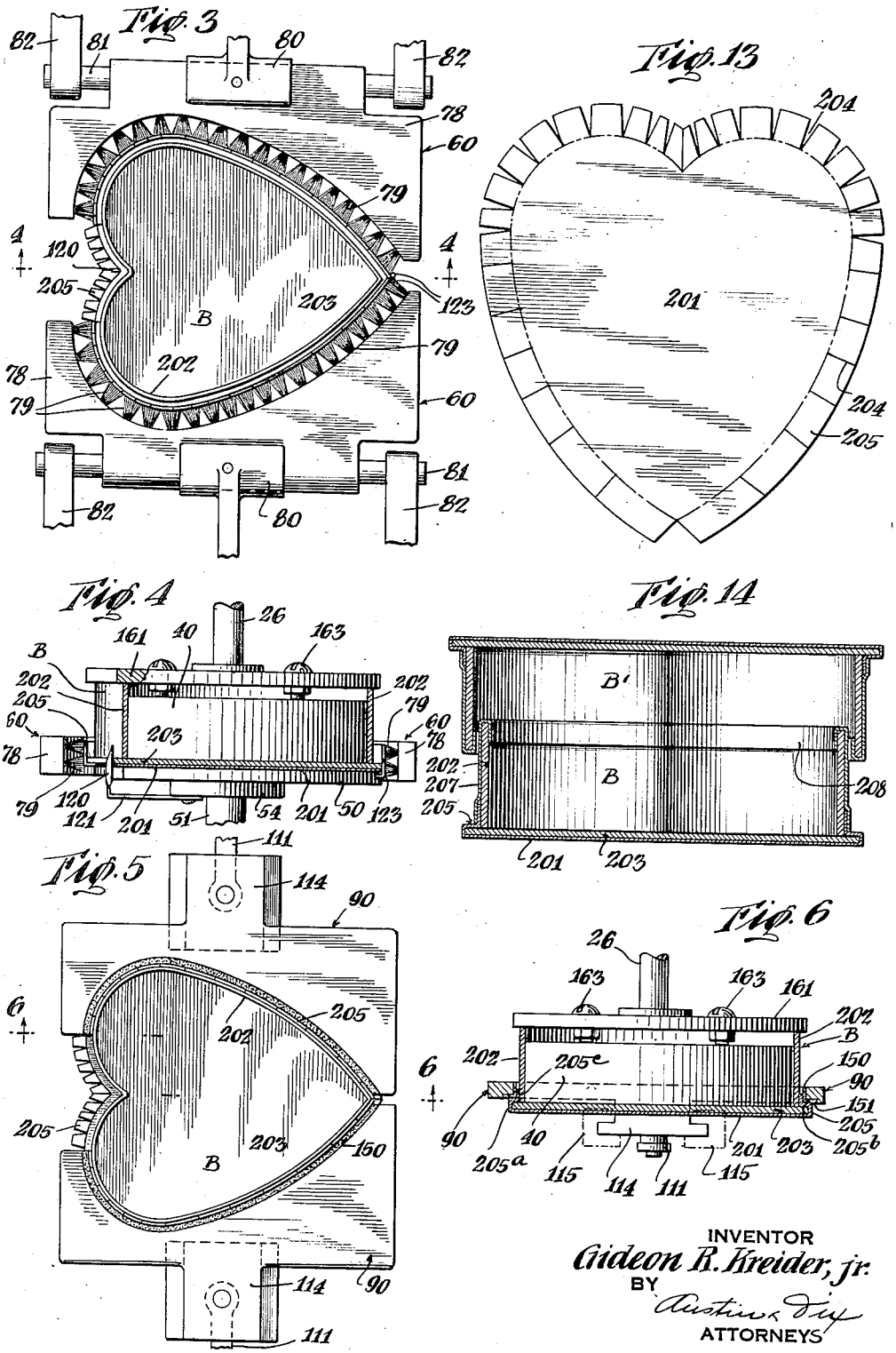

March 2, 1937.  G. R. KREIDER, JR  2,072,678
METHOD AND APPARATUS FOR MAKING BOXES
Original Filed July 29, 1932  5 Sheets-Sheet 3
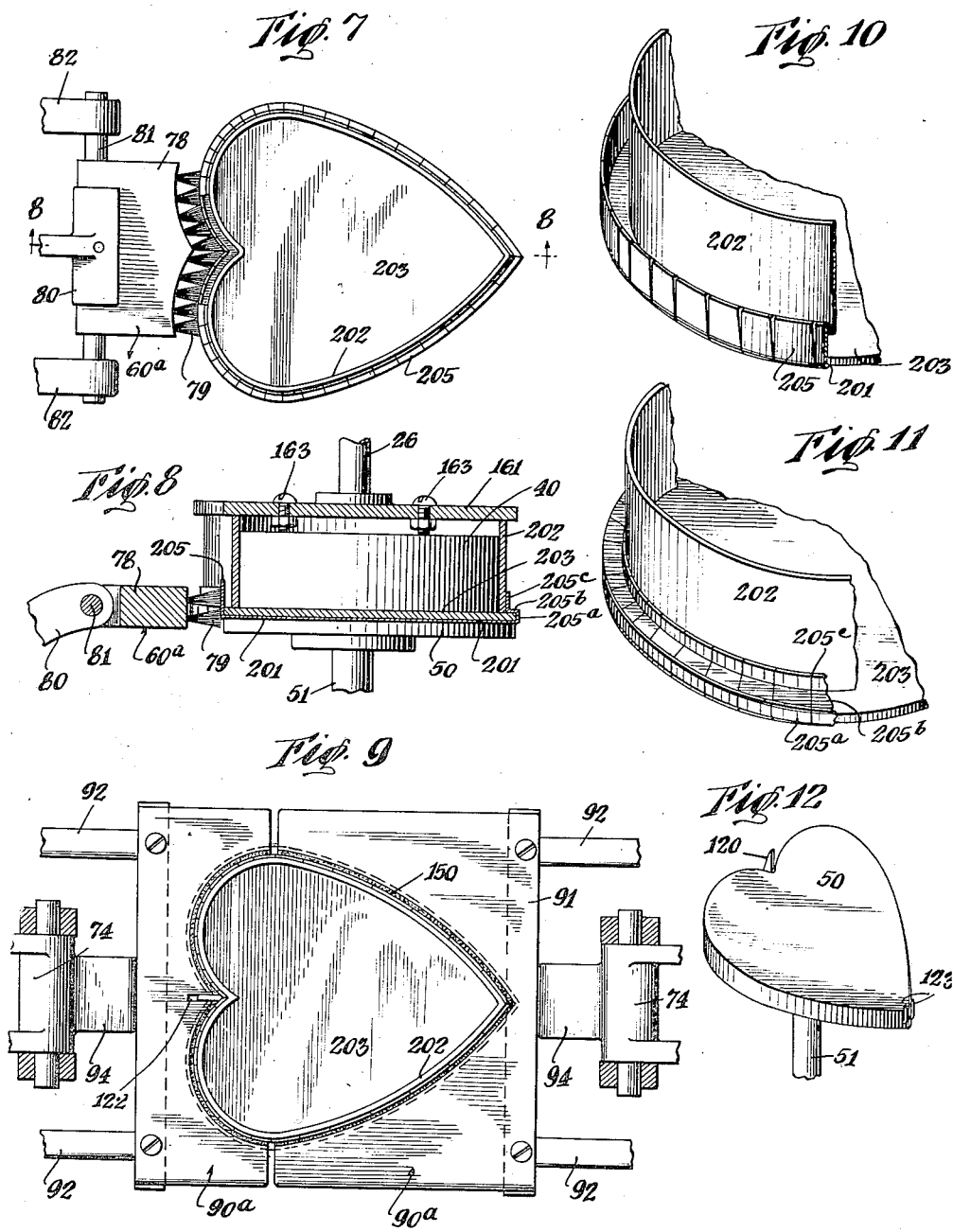

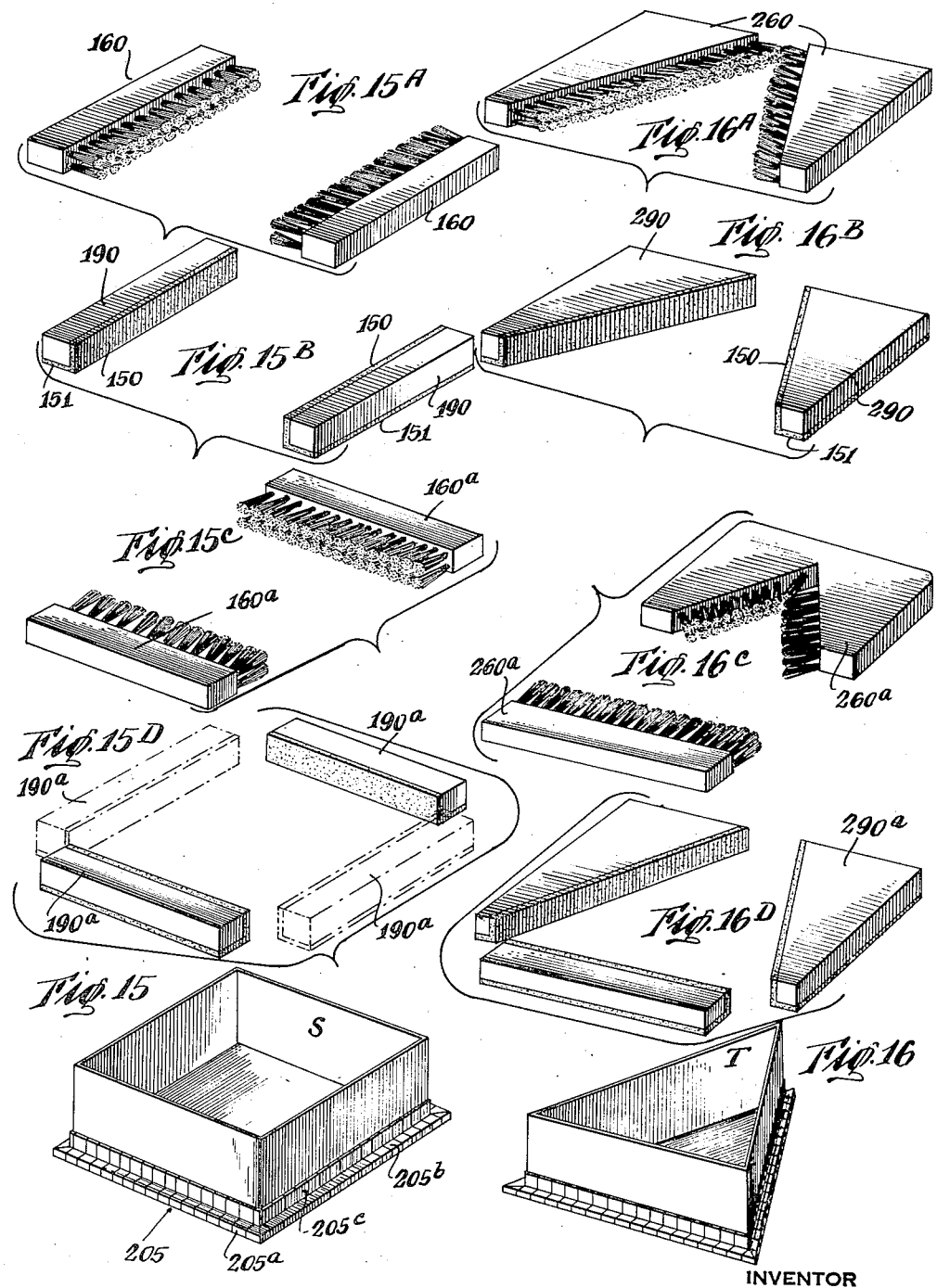

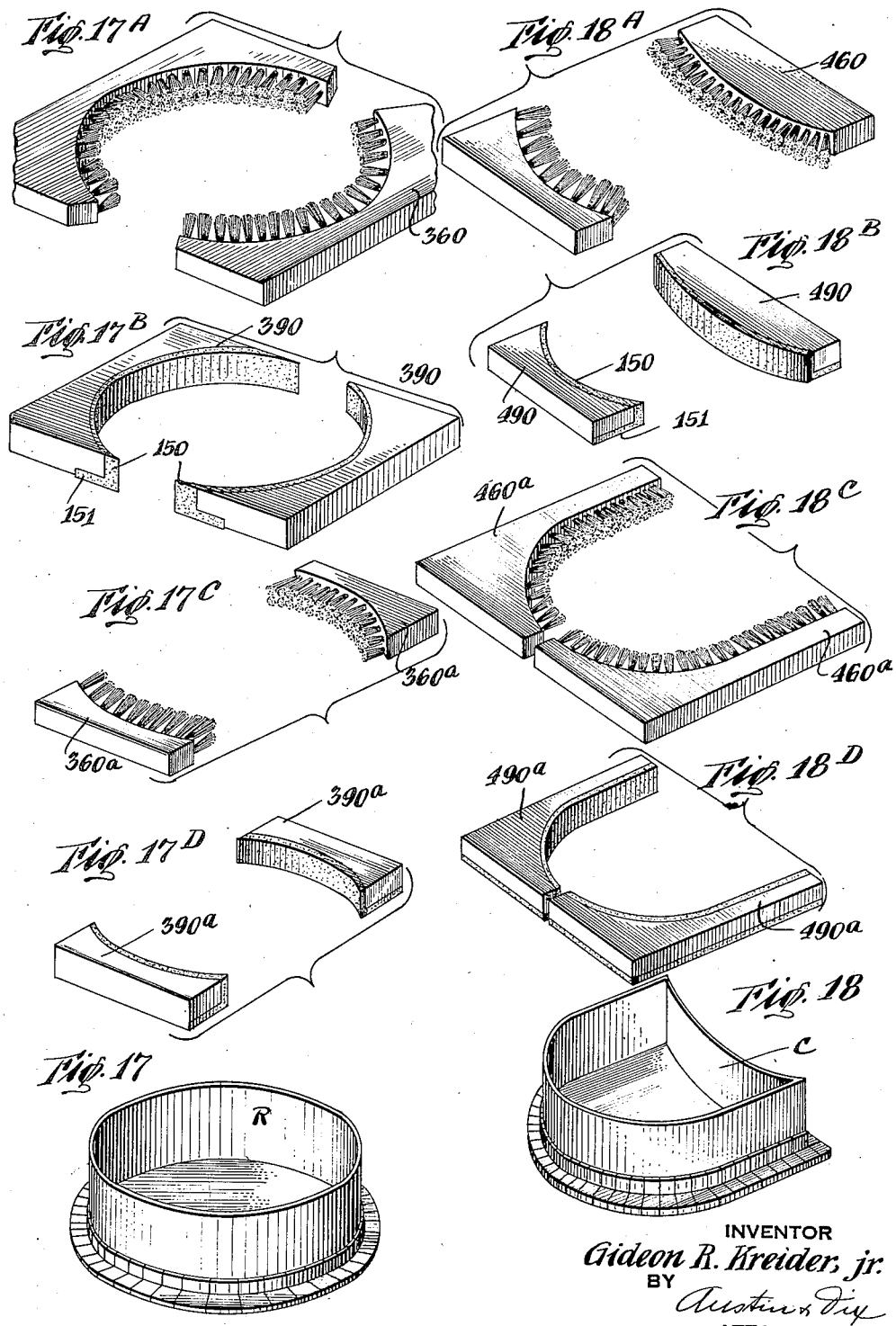

Patented Mar. 2, 1937

2,072,678

UNITED STATES PATENT OFFICE 2,072,678

METHOD AND APPARATUS FOR MAKING BOXES

Gideon R. Kreider, Jr., Lebanon, Pa.

Continuation of application Serial No. 625,584, July 29, 1932. This application December 26, 1934, Serial No. 759,155

34 Claims. (Cl. 93—54.2)

This invention relates to a method and apparatus for making boxes, and more particularly to an improved method and apparatus for assembling and wrapping laterally rimmed paperboard boxes of regular or irregular shape and contour. This application is a continuation of my co-pending application Serial No. 625,584 filed July 29, 1932.

As far as I am aware, no boxes having a laterally extending rim portion have heretofore been assembled and wrapped automatically on a wrapping machine, nor has any method of assembling such boxes heretofore been devised which could be efficiently and effectively executed by machine. Such boxes have heretofore been made by hand only, with the aid of simple hand tools. Such boxes have consequently been very expensive as compared with the straight sided rectangular boxes now wrapped automatically by machine, and while attractive and desirable, laterally rimmed boxes have therefore been used very little except for expensive packages.

An object of this invention is to provide a method of assembling and wrapping laterally rimmed boxes of either regular or irregular outline, with speed and efficiency, and with economy as to material and labor.

Another object of this invention is to provide an apparatus for making laterally rimmed boxes of regular or irregular contour automatically.

Still another object of this invention is to provide apparatus which may be attached to wrapping machines in common use and which will operate in conjunction therewith to wrap laterally rimmed boxes of regular or irregular shape and contour with speed, efficiency and economy.

Another object of this invention is to provide an attachment adapted to be applied to box making and wrapping machines in common use for assembling and wrapping laterally rimmed boxes, which can be easily and quickly connected to such machines, which operates in perfect synchronism therewith, which is sturdy, strong and lasting in construction, substantially foolproof in operation, and which may be operated as fast as the machine to which it is attached can operate.

Other objects of this invention will become apparent as the disclosure proceeds.

In accordance with this invention, laterally rimmed boxes having side walls of rectangular or regular contour, and laterally rimmed boxes having side walls of irregular contour, such as cylindrical, elliptical, oval, heart-shaped, polygonal, concave, convex, and boxes with round or irregular shaped corners may be wrapped quickly, efficiently, effectively and economically by machine. The invention comprehends apparatus which may be attached to well known wrapping machines.

An upper form block, shaped to fit the inside of the box to be wrapped, is attached to the operating head of the wrapping machine. The box side wall is telescoped over the upper form block and may be held in position thereon by resilient clips. The box wrap is cut to the shape of the box contour and glued to the box bottom. The box bottom extends beyond the box side wall to provide the laterally extending rim. If the box to be assembled is of irregular contour, the edge portion of the wrap is preferably slit or notched to provide a series of tabs. The box bottom, with the wrap adhering thereto, is placed in position upon the lower form block or vertically reciprocating platform. Studs, projecting from the lower form block, engage the edges of the box bottom and retain the same in proper position on the block.

When the machine is operated, the upper form block, carrying the box side wall, moves downwardly and seats upon the lower form block, pressing the box bottom into firm adhering contact with the glued wrap sheet. The upper form block is provided with an overhanging ledge or plate adopted to engage the top edge of the side wall to press the lower edge thereof firmly against the bottom wall of the box. The upper and lower form blocks then move downwardly together, and during this movement the edge portions of the wrap come into contact with a series of brushes which are arranged to surround the box. The brushes wipe the edge portions of the wrap sheet upwardly into contact with the circumferential edge of the laterally extending rim portion of the bottom wall. When the box to be wrapped has a cylindrical, concave, convex, heart-shaped or generally irregular shaped side wall, the edge portions of the wrap is preferably slit or notched to provide tabs. If the edge portion of the wrap sheet is notched to provide spaces between the tab portions so that the tab portions will not overlap when applied to the box, the brushes may be arranged in substantially horizontal position. If the edge portion of the wrap sheet is slit so that it becomes necessary to overlap one tab upon another when applied to the box side wall, the brushes are then preferably placed in inclined position so that the tab portions of the wrap will be successively and progressively wiped into contact with the side walls of the box.

As the box continues its downward movement, pressure blocks move inwardly to press the tabs or edge portions of the wrap over and against the top face of the projecting rim portion of the box. The pressure blocks are preferably provided with a resilient wiping element such as brushes or soft felt on the underside thereof which irons the tabs or edge portions of the wrap firmly against the top face of the rim portion as the pressure blocks move inwardly. The vertical face of the pressure blocks are also preferably provided with wiping brushes or resilient felt to press the outer parts of the tabs or edge portion against the outside vertical face of the box side wall.

Following this operation, a second set of pressure or clamping blocks, moving at right angles to the first set of pressure blocks and shaped to conform to the box side walls, may be provided to again press the tabs or edge portions of the wrap sheet against the top face of the rim portion and the outside face of the box side wall. The second set of pressure blocks assures that the wrap will be firmly and securely fixed to the rim portion and box side wall.

In the event that the box to be wrapped is so irregular in contour that the edge portions of the wrap cannot be properly turned up by a single set of brushes, or turned in by a single set of pressure blocks, one set of brushes are provided to wipe upwardly one section of the edge portion of the wrap, followed by clamping blocks which wipe and iron this upturned section over the rim portion and against the side wall of the box, following which another set of wiping brushes come into play to wipe the remaining section of the edge portion of the wrap upwardly, followed by another set of clamping blocks which press and iron this section of the edge portion over the laterally extending rim and against the box side wall. Thus, by providing two distinct and independent sets of wiping brushes and clamping blocks, operating from different directions, laterally rimmed boxes of any irregular shape or contour may be quickly and effectively assembled and automatically wrapped on the machine.

Laterally rimmed boxes having padded bottoms, may also be formed on this machine. The padding is placed between the bottom wall of the box and the glued wrap sheet. The surface of the vertically reciprocating lower form block is suitably hollowed or concaved to conform with the desired shape of the padding. Preferably the outer area of the bottom wall is not padded, permitting the wrap sheet to adhere directly to the outside face of the bottom wall around the padded area. This is accomplished by providing a raised rim portion around the concaved area of the lower form block. It is understood however, that the bottom wall may be padded to the extreme edge thereof if desired by shaping the lower form block accordingly. It is also understood that the padding may be applied in patches to give the box wall any desired decorative design and is applied by hollowing the top surface of the lower form block to correspond with the desired padded design.

Where the word "box" is used in the specification and claims, it is understood that either the containing part and/or the cover part of the container is meant, and the same should be so construed.

The invention itself, as to its objects and advantages, and the manner in which it may be carried out, may be better understood by referring to the following description taken in connection with the accompanying drawings forming a part thereof, in which Figure 1 is a side elevational view of a wrapping machine with the box forming apparatus herein disclosed attached thereto, certain parts being shown in cross section to more fully illustrate certain features of the construction;

Figure 2 is a side elevational view of a fragmentary portion of the machine, showing particularly the mechanism for operating and manipulating one set of clamping or pressure blocks;

Figure 3 is an enlarged top plan view of the first set of wrap wiping brushes showing the arrangement of the brushes and associated manipulating devices for wrapping a laterally rimmed heart-shaped box;

Figure 4 is a vertical cross sectional view through the upper and lower form blocks and wiping brushes as they appear at one stage of the box forming operation, this view being taken at the line 4—4 of Fig. 3;

Figure 5 is a top plan view of one set of pressure blocks as they appear at another stage in the box forming operation;

Figure 6 is a vertical cross section view through the partially wrapped box, showing the upper form block and pressure blocks in elevation, this view being taken on line 6—6 of Fig. 5;

Figure 7 is a top plan view showing a second brush set operative to wipe upwardly any section or sections of the wrap sheet not operated upon by the first brush set shown in Figs. 3 and 4;

Figure 8 is a vertical cross sectional view through the upper and lower form blocks and the second brush set showing the remaining edge section of the wrap being wiped upwardly, this view being taken on line 8—8 of Fig. 7;

Figure 9 is a top plan view of a second set of clamping blocks operative to turn in and tightly press the second edge section of the wrap against the laterally extending rim and the side wall of the box, this set also being operative to give the edge portions of the wrap a second and further clamping pressure following the clamping pressure delivered by the first set of clamping blocks shown in Figs. 5 and 6;

Figure 10 is a fragmentary perspective view of an arcuate partially assembled laterally rimmed box as it appears after being operated upon by one or more brush sets;

Figure 11 is a fragmentary perspective view of the arcuate shaped box after having been operated upon by one or more sets of clamping blocks;

Figure 12 is a prospective view of a lower form block shaped to support the bottom wall of a heart-shaped box, means being provided for guiding and retaining the box bottom in proper operative position upon the form block;

Figure 13 shows a heart-shaped blank the edge portion of which has been slit and notched ready for application to a heart-shaped box body;

Figure 14 is a vertical cross sectional view through two completely wrapped and assembled laterally rimmed boxes, one of said boxes serving as a container for the contents and the other box serving as a telescoping cover therefor;

Figure 15 is a prospective view of a laterally rimmed rectangularly shaped box showing the wrap sheet applied and secured thereto;

Figure 15A is a perspective view of the first set of wiping brushes illustrating one step in the application of the wrap to the box;

Figure 15B is a perspective view of the first set of clamping blocks operative to perform the next succeeding wrapping operation;

Figure 15C is a perspective view of the second set of wiping brushes showing the position thereof for performing the next succeeding step in the wrapping operation;

Figure 15D is a perspective view showing the arrangement of the second set of clamping blocks operative to press and iron the edge portions of the wrap sheet against the laterally extending rim and the side walls of the rectangular shaped box;

Figure 16 is a perspective view of a laterally rimmed triangular shaped box which may be readily assembled and wrapped by the machine herein described;

Figure 16A is a perspective view showing the arrangement of the first set of brushes used in wrapping the triangular shaped box;

Figure 16B is a perspective view of the first set of clamping blocks which may be used in assembling the triangular shaped box;

Figure 16C is a perspective view of the second set of wiping brushes used in wrapping of the triangular shaped box;

Figure 16D is a perspective view of the second set of clamping blocks used in the assembly of the triangular shaped box;

Figure 17 is a perspective view of a laterally rimmed circular box as it appears when assembled and wrapped by the apparatus herein disclosed;

Figure 17A is a perspective view of the first set of wiping brushes used in wrapping the circular box;

Figure 17B is a perspective view of the first set of clamping blocks used in assembling the circular box;

Figure 17C is a perspective view of the second set of wiping brushes used in wrapping the circular box;

Figure 17D is a perspective view of the second set of clamping blocks used in assembling the circular box;

Figure 18 is a perspective view of a laterally rimmed concavo-convex box assembled and wrapped by the method and apparatus herein described;

Figure 18A is a perspective view of the first set of wiping brushes used in wrapping the concavo-convex box shown in Fig. 18;

Figure 18B is a perspective view of the first set of clamping blocks used in the formation of the concavo-convex box;

Figure 18C is a perspective view of the second set of wiping brushes used in wrapping the concavo-convex box; and Figure 18D is a perspective view of the second set of clamping blocks used in the assembly of the concavo-convex box shown in Fig. 18.

Similar reference characters refer to similar parts throughout the several views of the drawings.

There is shown in Fig. 1 a machine having the novel attachments associated therewith for assembling and wrapping laterally rimmed boxes. The machine generally comprises a table 1 supported by legs 2. A vertical extending drive shaft 3 extends through the table 1 and is supported at the lower end thereof by a thrust bearing mounted on the platform 4. The drive shaft 3 extends through a standard or gooseneck 5, resting on the table 1 of the machine. The drive shaft 3 is rotated by a suitable power source, such as a motor, connected to the shaft through a pulley wheel 6 and suitable connections. A clutch 7 controlled by a foot lever 8 is provided which may be actuated to throw the machine into and out of operation. Another foot lever 9 is effective for stopping the machine at any time.

A cam member 10 in the form of a cylindrical drum is mounted on the lower end of the shaft 3. The drum 10 is connected to operate the lower forming block 50 of the machine, as will hereafter be described. An operating drum 11 is mounted on the upper end of the shaft 3 and is operative to manipulate a main lever 12 pivotally mounted by means of a pivot 13 on the arm 14 of the gooseneck 5. The lever 12 is provided with a roller 15 mounted on the midsection thereof which rolls within the cam track 16 provided in the cam drum 11.

A pair of bracket arms 17 extend from the gooseneck 5 and support a pair of guide members 18. A plunger 19 reciprocates between the guide members 18 and carries the upper form block 40 at the lower end thereof. One end of the lever 12 is operatively connected to the plunger 19 by means of a connecting link 20 pivotally secured to the plunger 19 by means of a stud 21. To permit adjustment between the lever 12 and connecting link 20 an elongated slot 22 is provided in the link into which a stud 23, provided on the end of the lever, extends. The connection between the lever 11 and the link 21 may then be adjusted as operating conditions require by means of an adjusting screw 24. A counter weight 25 is attached to the other end of the lever 12 to balance the operation of the machine. Upper form block 40 is mounted on a tenon 26 secured to the end of the plunger 19, as shown in Figs. 1 and 2. The upper form block 40 and its various attachments will be described more in detail hereinafter.

Means are provided for stripping the finished box from the upper form block 40. A lever 27, supported by an arm 28, which branches upwardly from the gooseneck 5, is provided at one end with a roller 29 which rolls within a secondary cam track 30 provided in the upper drum. A connecting link 31 connects the free end of the lever 27 to a yoke 32. The yoke 32 carries the stripper fingers 33, which at predetermined times, pass through aligned apertures in the upper form block 40 to strip the wrapper box B therefrom. The stripper fingers 33 are guided in their vertical reciprocating movement by means of a pair of guide rods 34, which are secured to the yoke 32 and are adapted to slide within a pair of perforated lugs 35 suitably secured to the stationary guides 18. The cam slot 30 is so shaped as to manipulate the stripper fingers 32 in the proper manner when the machine is in operation.

A platform or lower form block 50 is mounted on the upper end of a hollow tube 51 adapted to telescope within a post member 52 which rests upon the base 53, formed in the frame-work of the machine. A suitable coupling connection 54 is provided to permit the lower form block 50 to be removed from the supporting tube 51.

A coil spring 45 is positioned within the hollow tube 51 and normally holds the form block 50 in raised position. The upper forming block 40 is arranged to seat on the lower form block 50 with the box bottom and its adhering wrapper confined therebetween. The lower form block is forced downwardly against the action of the spring 45 at predetermined intervals during which the wiping rushes 60 and 60a and the presser members 90 and 90a, come into play.

The wiping brushes 60 and 60a and the pressure members 90 and 90a, which will be described more in detail hereinafter, are manipulated by means of mechanism operatively connected to the shaft 3. A roller 61 carried on one end of the lever 62 rolls in the cam track 63 provided in the lower cam drum 10. The lever 62 is pivotally mounted intermediate its ends to an arm 64 supported by the platform 4. A link 65 is pivotally connected to the other end of the lever 62 and to a movable sleeve 66 surrounding the tube 51. The sleeve 66 is provided with a plurality of radiating arms 67. Four arms, equally spaced, are shown in the drawings for purposes of illustration, but the number of arms used and the angular position thereof will depend somewhat upon the shape of the box to be wrapped.

Each arm 67 carries a rod 68 having a stud 69 extending upwardly from the end thereof. The studs 69 reciprocate in a bearing 70 formed as a part of an extension 71 projecting from the slide 72. A link 73 is pivotally connected to each of the studs 69 and a cam 74.

The cam 74, pivoted about the point 75, is provided with a stud 76 adapted to engage the hooked end of a member 77 to rock the wiping brush 60 upwardly out of operative position. Each of the wiping brushes 60 and 60a comprises, generally, a brush block 78 to which a plurality of rows of brush bristles 79 are fastened. The brush blocks 78 are each secured to a suitable clamp 80 and the brush blocks are mounted to pivot about a horizontal rod 81 rotatably mounted in brackets 82. The brackets 82 extend inwardly from a plate 72 adjustably mounted on the platform 1 of the machine. The plate 72 may be retained in any desired adjusted position by the clamping device 99.

When the arms 68 are drawn downward, the cams 74 are rocked to draw the hooks 77 downward, causing the brush blocks 78 to swing or pivot from substantially horizontal position to substantially vertical position. The brushes 60 and 60a are thus moved out of the way permitting the box to move upward out of the machine after the wrapping operation has been completed. The brush blocks will drop back into horizontal position by gravity when the arms 68 are moved upward. The brackets 82 may be of different heights so as to support the various sets of brushes 60 and 60a at different convenient elevations.

The brushes 60 and 60a are provided with bristles 79 shaped to conform to the box contour to be wrapped. The brushes may be arranged in two separate sets, each set containing one or two brushes as found most convenient and desirable. In wrapping a heart-shaped box, for example, two brushes may be used in the first set, as shown in Fig. 3, while only one brush need be used in the second set, as shown in Fig. 7. The brushes 60 and 60a are designed to wipe portions 205a of the flaps 205 upwardly against the outer edge of the laterally extending rim, as illustrated in Figs. 8, 10 and 11.

In operation, the upper form block 40, carrying the box side wall 202, moves downwardly until it seats against the bottom wall 203, the bottom wall 203 and wrap 201 adhering thereto having been placed in proper position upon the lower form block 50. Both the upper block 40 and the lower block 50 then move down through the brushes 60 which operate to wipe selected sections of the glued flap portions 205a into adhesive contact with the edge of the laterally extending rim portion of the bottom wall 203. This operation will be described more in detail hereinafter.

In order to obtain the best results, it is preferable to provide a lower block 50 which is substantially the same shape and size as the bottom wall 203 of the box. When the bottom wall 203 of the box, having the center portion 201 of the wrap adhesively attached thereto, is placed upon the lower block 50, the glued flaps 205 of the wrap hang over the circumferential edge of the block 50, as will be appreciated by referring to Figs. 3 and 4. The bristles 79 of the brushes 60 and 60a are so shaped as to closely conform to the circumferential contour of the lower form block 50 and the bottom wall 203 positioned thereon.

It is highly important that the bottom wall 203 be held in proper fixed position so that a uniform laterally extending rim will result when the side wall 202 is applied. To this end means are provided for engaging the edges of the bottom wall 203 as illustrated in Figs. 4, 9 and 12. A knife element 120 extending from an arm 121 fixed to the underside of the form block 50 may be provided to engage the bottom wall 203 and the overlying wrap sheet 201. The upwardly projecting knife member 120 is preferably positioned so as to most satisfactorily grip the bottom wall. In the case of a heart-shaped box, for example, the knife member 120 may be positioned so as to engage the bottom wall 203 between the lobes thereof. The knife member 120 as shown will not interfere with the operation of the brush block 60 and 60a and the pressure blocks 90 and 90a may be slotted as at 122 to avoid striking the knife member when operated. If preferred, pin elements 123 arranged singly or in pairs may be used in conjunction with, or substituted for, the knife member 120, to hold the bottom wall 103 of the box in position, as illustrated in Figs. 4 and 12. The pin elements 123 need extend only the thickness of the bottom wall 203, so that the pressure blocks 90 and 90a will be free to move thereover.

After the box has moved through the first set of brushes 60, the first set of pressure or clamping blocks 90 move inwardly to press either all of or a section of the flaps 205 of the wrap sheet against the top surface of the rim portion and against the side wall 202 of the box, causing the flaps to firmly adhere thereto. The first set of clamping blocks, as shown in Fig. 5, are of the proper shape to engage sections of the flaps which have already been turned upwardly by the first brush set illustrated in Figs. 3 and 4. The first set of clamping brushes 90 move inwardly and outwardly and may be manipulated by mechanism which will now be described.

Referring more particularly to Figs. 1 and 2, a cam roller 101 fixed to arm 103 rolls in the cam slot 102 provided in the drum member 10. The arm 103 forms the stem of a T crank which is pivoted on the pin 105 extending from the framework of the machine. Two connecting links 106, extending in opposite directions and connected to the respective arms 104 of the T crank, are operatively connected to manipulate the clamping blocks 90. The links 106 are each connected to a crank arm 107 fixed to the crank shaft 110 journaled in the brackets 112 and 113 extending from the platform 1. The crank shaft 110 is provided with an upwardly projecting arm 108 provided with spaced legs 109 at the upper end thereof to which is attached a horizontally reciprocating rod 111. The rod 111, as shown more particularly in Figs. 2 and 5, is connected to a slidable frame member 114 adapted to reciprocate in suitable guides 115 provided in the framework of the machine. The clamping blocks 90 may be attached directly to the reciprocating frame member 114. The cam slot 102 is so shaped as to rock the T crank about the pivot pin 104, causing a corresponding pull or push on the link members 106 which are connected as above described to manipulate the clamping blocks 90 into and out of clamping contact with a box being wrapped.

The clamping blocks 90 are preferably provided with a felt padding 150 fixed to the inside face and a felt padding 151 fixed to the under side of the clamping block 90. The felt padding 151 operates to brush intermediate portions 205b of the flaps 205 into adhesive contact with the upper surface of the rim portion as the clamping blocks 90 move inwardly, and finally the padding 150 operates to press the extreme end portions 205c of the flaps 205 into adhesive contact with the side wall 202 of the box, as illustrated in Figs. 5 and 6. A selected edge section of the wrap is thus pressed into firm adhesive contact with the rim portion and side wall of the box.

A second set of brushes, as shown in Fig. 7 and 8, then come into play to wipe other sections of the flaps 205 into adhesive contact with the circumferential edge of the bottom wall 203 of the box. The brushes 60a are shaped to conform to the box contour and are manipulated by a mechanism similar to that used to manipulate brush blocks 60a as heretofore described. The brushes 60a are preferably positioned at a lower elevation than the brushes 60, and are shaped and designed to complete the upturn of the flaps 205. Any number of brush blocks 60a necessary for the purpose may be used.

After the box has moved through the first set of brushes 60, through the first set of clamping blocks 90, through the second set of brushes 60a, the second set of clamping blocks 90a move inwardly and press the unclamped sections of the flaps 205 against the top surface of the rim portion and the side wall 102 of the box. As shown more particularly in Figs. 1 and 9, the clamping blocks 90a are supported from a frame member 91 which, in turn, is supported by one or more rods 92, horizontally slidable within the bracket 93 projecting downwardly from the adjustable plate 72. Each of the cams 74 heretofore described is provided with a high point lug 94 which is effective to press against the frame member 91 and force the clamping blocks 90a inwardly into clamping engagement with the rim portion and the box side wall. A coil spring 96 may be provided to return the clamping blocks 90a to normal position when the pressure exerted by the lugs 94 has been removed.

Where convenient it is desirable to shape the clamping blocks 90a so that substantially the entire contour of the box rim and side wall will be engaged by each set. Thus flaps which have already been treated by the first set of clamping blocks may be given a second clamping action to insure positive adhesive contact between the wrap and the box.

It will also be appreciated that various combinations of brushes and blocks may be used best adapted for the purpose. For example, one or more brushes may be used in the first set either to partly surround or completely surround the box. The second set of brushes may either be shaped to substantially surround the box to give the wrap a second wiping treatment, or shaped to engage only a selected unwiped portion of the wrap. In the same way the first and second set of clamping blocks may be shaped, arranged and adjusted to apply a double clamping action to substantially all sections of the box wrap or a single clamping action to predetermined sections at predetermined intervals during the box wrapping operation. Almost every conceivable type of laterally rimmed box may be wrapped by different sets of wiping brushes and clamping blocks arranged and manipulated as above described.

For purpose of illustration only, there is shown in Fig. 15 a laterally rimmed rectangular box S which may be wrapped by a combination of wiping brushes and pressure blocks as illustrated in Figs. 15A to 15D, inclusive. Wiping brushes 160, comprising the first set, may be used to wipe the tab portions 205a along two sides of the box upwardly against the laterally extending rim, following which the pressure blocks 190 come into play to first press the tab portions 205b and then the portions 205c into adhesive contact with the top face of the rim and the side wall respectively of the box. Following the above operation, the wiping brushes 160a may be provided to wipe the tabs 205 upwardly along the other two side walls and clamping blocks 190a then operated to clamp the tabs 205 against the rim and side wall of the box. The second set of clamping blocks 190a, as illustrated in Fig. 15D, may comprise two clamping blocks operative to clamp only certain sections of the wrap tabs, or four pressure blocks operative to clamp all the tabs of the wrap. It is understood that each brush of the first brush set 160 may be made triangular in shape so that two triangular brushes together would substantially surround the box. In the same way, each clamp block of the first set of clamping blocks 190 and the second set of clamping blocks 190a may be made triangular in shape to effectuate either a single or a double clamping operation to the respective tabs 205.

As further illustrating the adaptability of the method and apparatus herein described to the wrapping of irregularly shaped boxes, there is shown in Fig. 16 a triangular shaped box T having a wrap sheet applied to the laterally rimmed bottom and side wall thereof by the brush and clamping block combination illustrated in Figs. 16A to 16D, inclusive. The first set of brushes 260 may be shaped to wipe two sides of the triangular box, followed by the first set of clamping blocks 290 designed to press the upturned tabs 205 into adhesive contact with the rim portion of the side wall of the box. This operation may be followed by a wiping action executed by a second set of wiping brushes 260a which may be arranged to wipe the unwiped tabs 205 upwardly, or to apply a second wiping action to the tabs already operated upon to insure positive adhesion of the tabs 205 to the circumferential edges of the bottom wall 203. Similarly, a second set of clamping blocks 290a may be provided to adhesively secure the tabs 205 to the rim portion and side wall of the box and also if desired, to apply a secondary pressure to the tabs.

Wraps may be applied to laterally rimmed round boxes R as shown in Fig. 17, by the brush and clamping block combination illustrated in Figs. 17A and 17D, inclusive, comprising a first set of wiping brushes 360, a first set of clamping blocks 390, a second set of wiping brushes 360a and, finally, a second set of clamping blocks 390a. The brushes and clamping blocks here illustrated may be shaped to extend any desired distance around the box side wall.

To still further illustrate the versatility of the box shapes which may be wrapped by the apparatus and method herein described, there is shown in Fig. 18 a laterally rimmed box C having a plurality of side walls, some of which are concave, others convex and still others substantially straight. A wrap may be applied to the irregularly shaped box C shown in Fig. 18 by the combination brush and clamping devices illustrated in Figs. 18A to 18D, inclusive, comprising a first set of wiping brushes 460, a first set of clamping blocks 490, a second set of wiping brushes 460a and a second set of clamping blocks 490a.

At the conclusion of the wrapping operation, the upper form block 40 moves upwardly, carrying the wrapped box with it. The sleeve 66 is drawn downwardly, rocking the cam 74 and tilting the brush blocks 60 and 60a so as to permit the wrapped box to pass freely therethrough. The stripping fingers 33 then come into play to strip the wrapped box off the upper form block 40, permitting the box to drop to resting position on the lower form block 50. The ejector 98 then operates to push the box off from the lower form block.

To complete the wrapping operation, a wrap strip 207 is applied around the side wall 202 of the box, as illustrated in Fig. 14. The wrap strip 207 may be provided with a portion 208 which extends around the top edge and is secured to the inside face of the box side wall. The wrap strip 207 may be applied automatically on a stripping machine.

It will be noted that the wrap sheet 201 may be used to secure the side wall 202 of the box to the bottom wall 203. However, the side wall 202 and the bottom wall 203 may be secured together prior to the wrapping operation by suitable edging strips, by securing flaps or other means. The body structure of the box may be made in any desired manner and of any shape. The apparatus and method herein described will operate successfully on any shape box laterally rimmed, or not rimmed. If the box is not laterally rimmed, the felt portion 151 applied to the lower side of the first and second sets of clamping blocks may be eliminated.

The upper form block 140 is provided with a plate member 161 mounted on the top thereof. The plate member 161 is supported on a pair of adjustable screws 163 which extend into the block 40. By manipulating the screws 163, vertical adjustment of the plate 161 with reference to the pressure block may be made. By referring more particularly to Figs. 4 and 6, it will be noted that the plate 161 overhangs the side wall 202, holding the same tightly pressed against the bottom wall 203 of the box during the wrapping operation. The upper form block 40 may be made of such size as to snugly fit within the side wall 202 frictionally holding the same in position thereon. If necessary, suitable clamps may be provided to retain the side wall on the upper form block as it moves downwardly to seat upon the bottom wall 203.

The bottom wrap may be provided with either slits or notches, 204. Where the box body is arcuate shape, the notches 204, as indicated in Fig. 13, are so cut that when the wrap is applied, the flaps 205 will closely abut one another as indicated in Fig. 11.

In assembling the box, the bottom wall 203, with the glued wrap sheet secured thereto, is placed on the lower pressure block 50. The side wall 202 is telescoped over the upper form block 40. As the upper form block 40 moves down into seating position against the bottom wall 203, the plate 161, engages the top edge of the side wall 202 and presses the same into close contact with the bottom wall 202. As the form blocks 40 and 50 move downwardly, the first set of brushes 60, then the first set of clamping blocks 90, then the second set of brushes 60a, and finally the second set of clamping blocks 90a, come into play as heretofore described.

By means of the method and apparatus herein described, a single operator can easily wrap seven hundred irregularly shaped, laterally rimmed boxes per hour. Rimmed or unrimmed boxes of any irregular outline can be wrapped by the method and apparatus herein disclosed without difficulty. Furthermore, decorative rims of regular or irregular shape may be applied and wrapped which do not necessarily conform to the contour of the box side wall. Boxes which have heretofore been made only by hand can thus be reproduced mechanically at greatly reduced cost.

While certain novel features of the invention have been disclosed and are pointed out in the annexed claims, it will be understood that various omissions, substitutions and changes may be made by those skilled in the art without departing from the spirit of the invention.

What is claimed is:

1. The method of mechanically assembling boxes having a laterally extending rim which includes, providing a wrap sheet, slitting the edges of said sheet to provide tab portions, and ironing said tab portions to said laterally extending rim by ironing pressure moving inwardly in a plane substantially parallel to the surface of said rim.

2. The method of mechanically assembling boxes having a laterally extending rim which includes, providing a wrap sheet, securing the main portion of said sheet to the box bottom, and ironing the edge portion of said sheet to said laterally extending rim by ironing pressure moving inwardly in a plane substantially parallel to the surface of said rim.

3. The method of mechanically assembling boxes having a laterally extending rim which includes, providing a wrap sheet, slitting the edges of said sheet to provide tabs, securing the main portion of said sheet to the box bottom, ironing the intermediate portions of said tabs to the top face of said laterally extending rim, pressing the free end portions of said tabs against the side walls of the box, and securing a wrap strip around the side wall of the box.

4. The method of making boxes having side walls of arcuate shape and a laterally extending rim which includes, providing a wrap sheet, slitting the edges of said sheet to provide, tabs, ironing the intermediate portions of said tabs to the top face of said laterally extending rim, and pressing the end portions of said tabs against the side walls of the box.

5. The method of mechanically assembling boxes having a laterally extending rim which includes, providing a continuous side wall, positioning an oversize bottom wall against the end thereof, securing a wrap sheet to the projecting edge of the bottom wall and the outside face of the side wall, and applying secondary pressure to the wrap sheet and projecting edge of the bottom wall and the outside face of the side wall to bind the same together in assembled relationship.

6. The method of mechanically assembling boxes having a laterally extending rim which includes, providing a wrap sheet, a continuous side wall, and an oversize bottom wall, positioning the bottom wall against the end of the side wall, securing the central portion of the wrap sheet to the bottom face of the bottom wall and around the projecting rim thereof, securing the edges of said sheet to the outside face of the side wall, and applying secondary pressure to the edges of said sheet to permanently bind the sheet to the outside face of the side wall.

7. The method of mechanically assembling laterally rimmed boxes which includes, providing a wrap sheet, a continuous side wall and an oversize bottom wall, securing the main portion of said wrap sheet to the bottom face of the bottom wall, securing another portion to the top face of the rim portion, securing the edge portions of the sheet to the outside face of the side wall, and applying secondary pressure to the edge portions of the sheet and to the outside face of the side wall so as to permanently attach the parts together in assembled relation.

8. The method of mechanically assembling boxes having a laterally extending rim portion which includes, providing a wrap sheet, a continuous side wall and a bottom wall, securing the main portion of the wrap sheet to the bottom wall, pressing the lower edge of the side wall against the bottom wall, wiping a portion of said wrap around and against the lateral projecting rim of the bottom wall, ironing another portion of the wrap into adhering contact with the top face of the laterally projecting rim by ironing pressure moving inwardly in a plane substantially parallel to the top face of the rim and securing the outer edge of the wrap to the outside face of the box side wall.

9. The method of mechanically assembling laterally rimmed boxes which includes, providing a wrap sheet, a continuous side wall and a lateral projecting bottom wall, slitting the edges of said sheet to provide tab portions, gluing the sheet, pressing the sheet to the bottom face of the bottom wall, pressing the lower edge of the side wall against the bottom wall, wiping said tab portions into contact with the top face of the lateral projecting rim by wiping pressure moving inwardly in a plane substantially parallel to the top face of said rim, and pressing the outer edges of said tab portions against the box side wall to hold the box parts in assembled set up relationship.

10. The method of mechanically assembling lateral rimmed boxes which includes, providing a wrap sheet, a continuous side wall and a bottom wall the rim portion of which projects beyond said side wall, slitting the edges of said sheet to provide tab portions, gluing the wrap sheet, pressing the bottom wall against a lower form block so as to cause the wrap sheet to adhere thereto, pressing the lower edge of the sidewall against the bottom wall, wiping said tab portions upwardly against the outside edge of the rim portion, ironing the intermediate portions of said tabs against the top face of said rim portion and pressing the free end portions of said tabs against the outside face of the side wall to adhesively bind the box parts in assembled set up relationship, and securing a wrap strip around the side wall in overlapping relation to said tabs.

11. The method of making laterally rimmed boxes which includes, providing a wrap sheet, gluing said wrap sheet, pressing the sheet into adhesive contact with the bottom wall of the box, wiping the wrap sheet against the outer edge of the bottom wall, and ironing the edges of the wrap sheet over and against the top face of the laterally projecting rim by ironing pressure moving inwardly in a plane substantially parallel to the top face of said rim.

12. The method of making laterally rimmed boxes which includes, providing a wrap sheet, gluing said wrap sheet to the bottom wall of the box, wiping the wrap sheet against the outer edge of the bottom wall, ironing the intermediate portions of the wrap to the top face of the rim portion, and pressing the outer edge portion of said wrap to the side walls of the box.

13. Steps in the method of making laterally rimmed irregular shaped boxes which includes, providing a wrap sheet, slitting the edges thereof to provide tab portions, gluing said wrap sheet to the bottom wall of the box, wiping the wrap sheet against the outer edge of the bottom wall, ironing the intermediate portions of said tabs to the top face of the rim portion, and pressing the free end portions of said tabs to the outside face of the box side walls to bind the box parts in assembled set up relationship.

14. The method of making laterally rimmed boxes which includes, providing a wrap sheet, gluing said wrap sheet to the bottom wall of the box, and progressively gluing predetermined edge sections of the wrap sheet to the top face of the rim portion and to the side walls of the box.

15. A lower form block adapted to support a box bottom, and means extending from said form block for gripping the box bottom to retain the same in position on the form block.

16. A lower form block adapted to support a box bottom, and means extending from said form block for gripping the edge of the box bottom to retain the same in position on said form block.

17. Apparatus for wrapping boxes having a laterally extending rim, including in combination, an upper form block having side wall portions adapted to fit within the box and shaped to conform to the inside surface of the box side walls, a lower form block adapted to support the box bottom, and means associated with the lower form block for gripping the box bottom to retain the same in position on said lower form block, said means comprising lugs extending upwardly from said lower form block.

18. Apparatus for wrapping boxes having arcuate side walls including in combination, an upper form block having side wall portions adapted to fit within the box and shaped to conform to the inside surface of the box side walls, a lower form block adapted to support the box bottom, said form block being slightly smaller in exterior dimension than said box bottom so that the box bottom will project beyond the outside edges of said lower form block, and means adapted to grip the edge of the box bottom and hold the box bottom in proper position on the lower form block.

19. Apparatus for wrapping boxes having irregular shaped side walls, including in combination, an upper form block having side wall portions adapted to fit within the box and shaped to conform to the inside surface of the box side walls, resilient means arranged to press and hold the inwardly concave portions of the box side walls against the side wall portions of the form block, a lower form block adapted to support the box bottom, and means for gripping the box bottom to retain the same in position on the lower form block.

20. Apparatus for making boxes having a laterally extending rim, including in combination, an upper form block adapted to be passed interiorly into a box, a lower form block adapted to support the box bottom, means for retaining the box side wall in position on said upper form block, means associated with said upper form block adapted to press the lower edge of the box side wall against the box bottom, and means for pressing a glued wrap sheet into adhesive contact with the laterally extending rim and the box side wall.

21. Apparatus for making boxes having a laterally extending rim including in combination, an upper form block adapted to be passed interiorly into the box side wall, a lower form block adapted to support the box bottom, means for gripping the box bottom to retain the same in position on said lower form block, and means for pressing and holding the lower edge of the box side wall against the box bottom.

22. Apparatus for making boxes having a laterally extending rim, including in combination, an upper form block adapted to be passed interiorly into the box side wall, a lower form block adapted to support the box bottom, means for gripping the box bottom to retain the same in position on said lower form block, adjustable means overhanging the upper form block for pressing and holding the lower edge of the box side wall against the box bottom, and means for pressing the glued wrap sheet into adhesive contact with the laterally extending rim and the side walls of the box.

23. Apparatus for making boxes having a laterally extending rim, including in combination, an upper form block adapted to fit within the box and shaped to conform to the inside surface of the box side walls, means for retaining the box side wall in position on said form block, a lower form block adapted to support the box bottom, means projecting from said lower form block adapted to engage the edge of the box bottom to retain the same in proper position thereon, and adjustable means overhanging the upper form block adapted to press and hold the lower edge of the box side wall against the box bottom when said form blocks are manipulated.

24. Apparatus for wrapping boxes having a laterally extending rim including in combination, means for pressing a glued wrap sheet into adhesive contact with the outside face of the box bottom, and horizontally reciprocating means for pressing an edge portion of the wrap sheet over the top face of said rim portion, said means moving substantially reciprocating into a plane substantially parallel to the top face of said rim.

25. Apparatus for wrapping boxes having a laterally extending rim including in combination, means for pressing a glued wrap sheet into adhesive contact with the outside face of the box bottom, horizontally reciprocating means for pressing an edge portion of the wrap sheet against the top face of the box rim, and horizontally reciprocating means for pressing another edge portion of the wrap sheet against the outside face of the box side wall.

26. Apparatus for wrapping boxes having a laterally extending rim portion, including in combination, means for pressing a glued wrap sheet into adhesive contact with the outside face of the box bottom, automatically operated means for wiping another portion of the wrap sheet upwardly against the edge of the laterally projecting rim, and horizontally reciprocating means for pressing a further portion of the wrap sheet over and against the top face of said rim portion and against the outside face of the box side wall, said means reciprocating in a plane substantially parallel to the top face of said rim.

27. Apparatus for wrapping boxes having a laterally extending rim, including means for pressing a glued wrap sheet into adhesive contact with the outside face of the box bottom, automatically operated means for wiping a section of the wrapper upwardly against the edge of the laterally projecting rim, automatically operated means for further wiping said edge section over the top face of said rim portion and against the outside face of the box side wall, automatically operated means for wiping another edge section of the wrap upwardly against another edge of the laterally projecting rim, and automatically operated means for wiping said second edge section against the top face of another section of said rim.

28. Apparatus for making boxes having a laterally extending rim including in combination, means for pressing a glued wrap sheet into adhesive contact with the outside face of the box bottom, automatically operated means for wiping the edge portion of the wrap sheet upwardly against the circumferential edge of the lateral projecting rim, horizontally reciprocating means for wiping said edge portion over the top face of the lateral projecting rim, and means for ironing and pressing said edge portion into firm adhesive contact with the top face of said rim.

29. Apparatus for making boxes having a laterally extending rim including in combination, means for pressing a glued wrap sheet into adhesive contact with the outside face of the box bottom, automatically operated means for wiping the edge portion of the wrap sheet upwardly against the circumferential edge of the lateral projecting rim, means for wiping said edge portion over the top face of the lateral projecting rim, means for ironing and pressing said edge portion into firm adhesive contact with the top face of said rim, and means for pressing the edge portions firmly against the outside face of the box side wall.

30. Apparatus for wrapping boxes having a laterally extending bottom rim, including wiping members operative to wipe edge sections of the glued wrap into adhesive contact with the projecting edge of the laterally extending rim, and reciprocating clamping members shaped to conform to the side walls of the box and adapted to move inwardly in a plane substantially parallel to the top face of said rim, said clamping members having means associated therewith operative to firmly press said edge section of the wrap sheet into adhesive contact with the top face of the laterally extending rim and the outside face of the box side wall.

31. Apparatus for wrapping boxes having a laterally extending bottom rim, including in combination, wiping members operative to wipe edge sections of the wrap into adhesive contact with the projecting edge of the laterally extending rim, and reciprocating clamping members shaped to conform to the side walls of the box and operative to move inwardly in a plane substantially parallel to the top face of said rim, said clamping members having means associated therewith to firmly press the side edge sections of the wrap into adhesive contact with the top face of the laterally extending rim and means for firmly pressing another edge section of the wrap sheet into adhesive contact with the box side walls.

32. Apparatus for wrapping boxes having a laterally extending rim including, a support for said box, means for reciprocating said box support vertically, wiping members, means for automatically reciprocating said wiping members in a horizontal plane in synchronism with said vertically reciprocating means, said wiping members having resilient wiping portions adapted to wipe the wrap into contact with the vertical edge of said rim, and means movable in a plane substantially parallel to the face of said rim for wiping the wrap into contact therewith.

33. Apparatus for wrapping boxes having a laterally extending rim including, a support for said box, means for reciprocating said box support vertically, wiping members having resilient wiping portions adapted to wipe the wrap into contact with the vertical edge of said rim as said box support is vertically reciprocated, and means for wiping a portion of said wrap into contact with the face of said rim, said means having a resilient cushion contacting the wrap.

34. Apparatus for wrapping boxes having a laterally extending rim including, a support for said box, means for reciprocating said box support vertically, resilient wiping members operative to wipe the wrap against the vertical edge of said rim, and separate means reciprocating in a plane parallel to the face of said rim for wiping the wrap into contact therewith.

GIDEON R. KREIDER, Jr.